(12) United States Patent
Rademacher et al.

(10) Patent No.: US 6,899,614 B1
(45) Date of Patent: May 31, 2005

(54) VENTILATION UNIT FOR A MOTOR VEHICLE

(75) Inventors: Greg Rademacher, Clarkston, MI (US); Don Masterson, Auburn Hills, MI (US)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/731,529

(22) Filed: Dec. 8, 2003

(51) Int. Cl.[7] .................................................. B60H 3/00
(52) U.S. Cl. ......................... 454/156; 454/126; 454/160
(58) Field of Search ................................ 454/156, 121, 454/126, 159, 160, 154, 286

(56) References Cited

U.S. PATENT DOCUMENTS

| | | | | |
|---|---|---|---|---|
| 5,823,869 A | * | 10/1998 | Paturzo | ....................... 454/152 |
| 6,318,102 B1 | * | 11/2001 | Asou et al. | .................. 454/137 |
| 6,482,081 B2 | * | 11/2002 | Vincent et al. | ............. 454/156 |
| 6,616,523 B1 | * | 9/2003 | Tani et al. | ................... 454/154 |
| 6,783,173 B2 | * | 8/2004 | Nakamura et al. | .......... 454/121 |

* cited by examiner

Primary Examiner—Jiping Lu
(74) Attorney, Agent, or Firm—Leydig, Voit & Mayer, Ltd.

(57) ABSTRACT

A ventilation unit for a motor vehicle is provided comprising a housing with air ducts for supplying air through panel openings into the interior of the vehicle. At least one draft tube is disposed in the housing adjacent said panel openings, where the at least on draft tube includes an outlet slot arranged to be exposed to the air stream exiting the panel openings. The draft created by the air stream crossing over the slot draws hot air from the interior of the draft tube to be mixed with the exiting air stream. The amount of drafting created by the air stream depends on the velocity of the exiting airflow. This relationship in turn makes the ventilation unit of the present invention perform as a passive device.

10 Claims, 5 Drawing Sheets

VENTILATION UNIT FOR A MOTOR VEHICLE

FIELD OF THE INVENTION

The present invention relates to a ventilation unit for a motor vehicle, particularly to a unit comprising a housing with air ducts for supplying air through a panel opening to the interior of the motor vehicle.

Conventional ventilation or air conditioning units of the present type are configured to mix cold or temperate air from the outside with heated air generated in a heater core. The velocity of the cold air stream is generally higher than that of the hot air, at least partially due to the fact that the hot air has passed through a heater core. Consequently, when the cold doors for regulating cold air flow are open, the higher velocity of the cold air causes the total flow to become stratified. In some cases, a large temperature gradient across the outlet openings of the ventilation unit can arise. This can be felt by the occupants of the motor vehicle and may cause discomfort. In the case of defrosting or demisting, the temperature gradient across the panel can lead to non-uniform defrosting effects.

SUMMARY OF THE INVENTION

An object of the present invention is to provide a ventilation unit in which the difference in air temperatures across the panel outlet openings is minimized. In one embodiment of the invention, a temperature gradient across the panel outlet opening is not greater than about 5° F.

According to the present invention, a ventilation unit for a motor vehicle is provided comprising a housing with air ducts for supplying air through panel openings to the interior of the motor vehicle. At least one draft tube is disposed in the housing adjacent said panel openings. The at least one draft tube has an outlet slot arranged to be exposed to the air stream exiting from the panel openings. The air stream passing across the outlet slot creates a vacuum or draft within the draft tube, which for example allows warm or hot air to be drawn into and mixed with the cold air stream passing the exterior of the draft tube.

This arrangement has the particular advantage that the desired air mixing is achieved passively without the necessity of regulation means. No additional or moving parts are required, resulting in reduced maintenance and manufacturing costs.

In a preferred embodiment, the at least one draft tube is arranged along an elongate side of the panel openings. In this arrangement the outlet slot of the draft tube runs substantially parallel to the longitudinal direction of the panel openings. As a result, a larger portion of the exiting air stream can be mixed with warm air drawn out of the draft tube.

In a further embodiment, two draft tubes are provided, each tube being arranged along opposite elongate sides of the panel openings. Again in this embodiment, the outlet slots run parallel to longitudinal direction of the outlet openings, but on either side of the outlet openings.

In a further embodiment, a first end of the draft tube is provided as an air inlet opening, while the outlet slot is formed axially in a side wall of the draft tube. The outlet slot can extend over at least half of the axial length of the draft tube.

In another preferred embodiment, the outlet slot has a varying width along the axial direction of the draft tube. In this manner, more or less drafted air can be supplied to the cold air stream, depending on axial position within the cold air stream.

Further objects, features and advantages of the invention, will become apparent from the detailed description of the preferred embodiments that follows, when considered in conjunction with the attached figures of drawing.

BRIEF DESCRIPTION OF THE DRAWINGS

Exemplary embodiments of the invention are given below with reference to the drawing, in which.

DETAILED DESCRIPTION OF PREFERRED EMBODIMENTS

Figure 1:
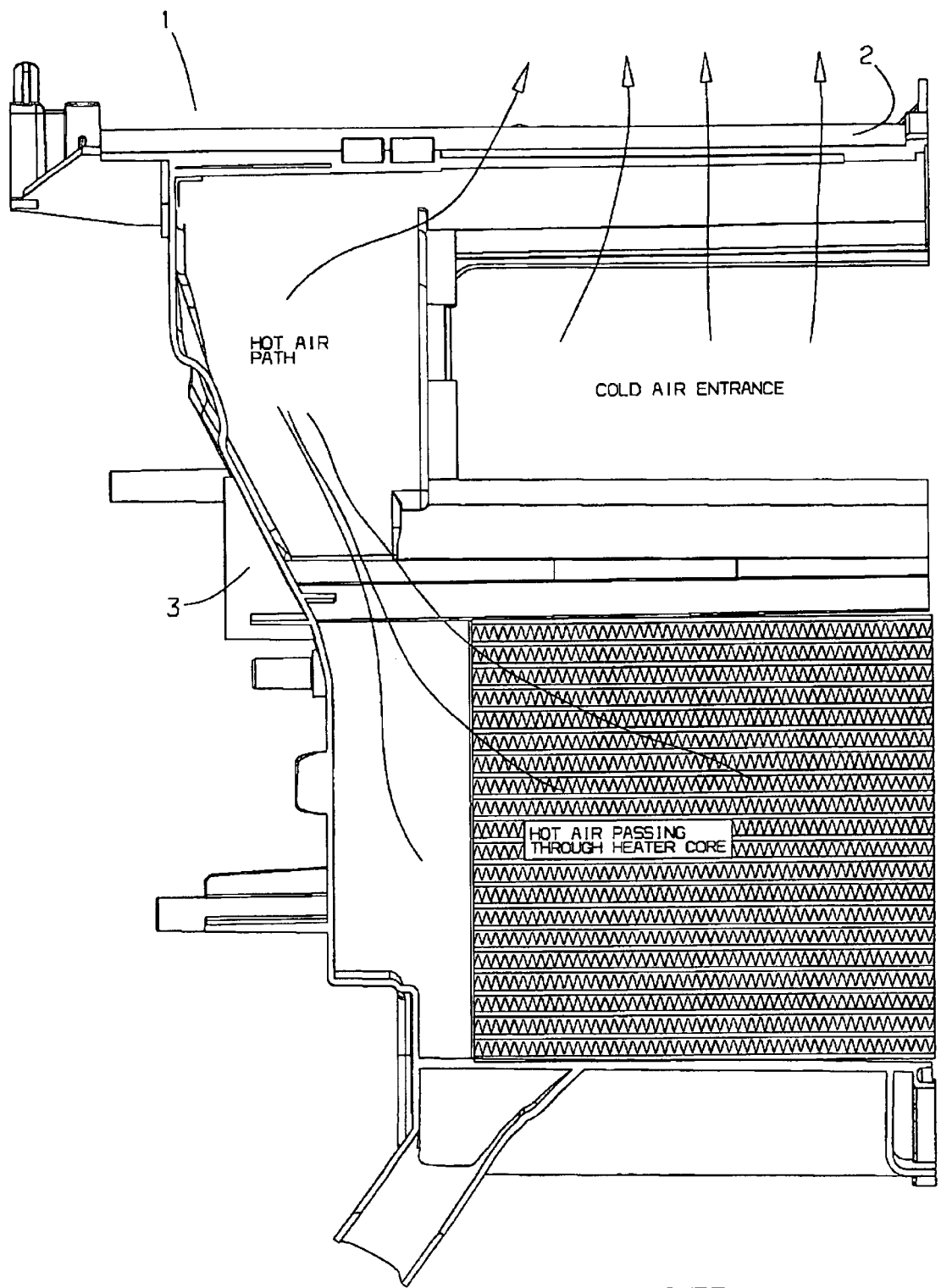
FIG. 1 is an illustration of a conventional ventilation unit showing hot and cold airflows.

FIG. 1 shows a conventional ventilation unit for use in heating and/or cooling the interior of a motor vehicle. The ventilation unit 1 contains a housing 3, where a mixture of hot and cold air exit the panel opening 2. As discussed above, when the mixture of cold and hot air flows is incomplete due to the high cold air velocity, the air stream exiting from the panel openings 2 is stratified. Greatly stratified air leaving the unit is noticeable and can be felt by an occupant of the vehicle. The present invention addresses this problem as is discussed in detail below in conjunction with preferred embodiments.

Figure 2:
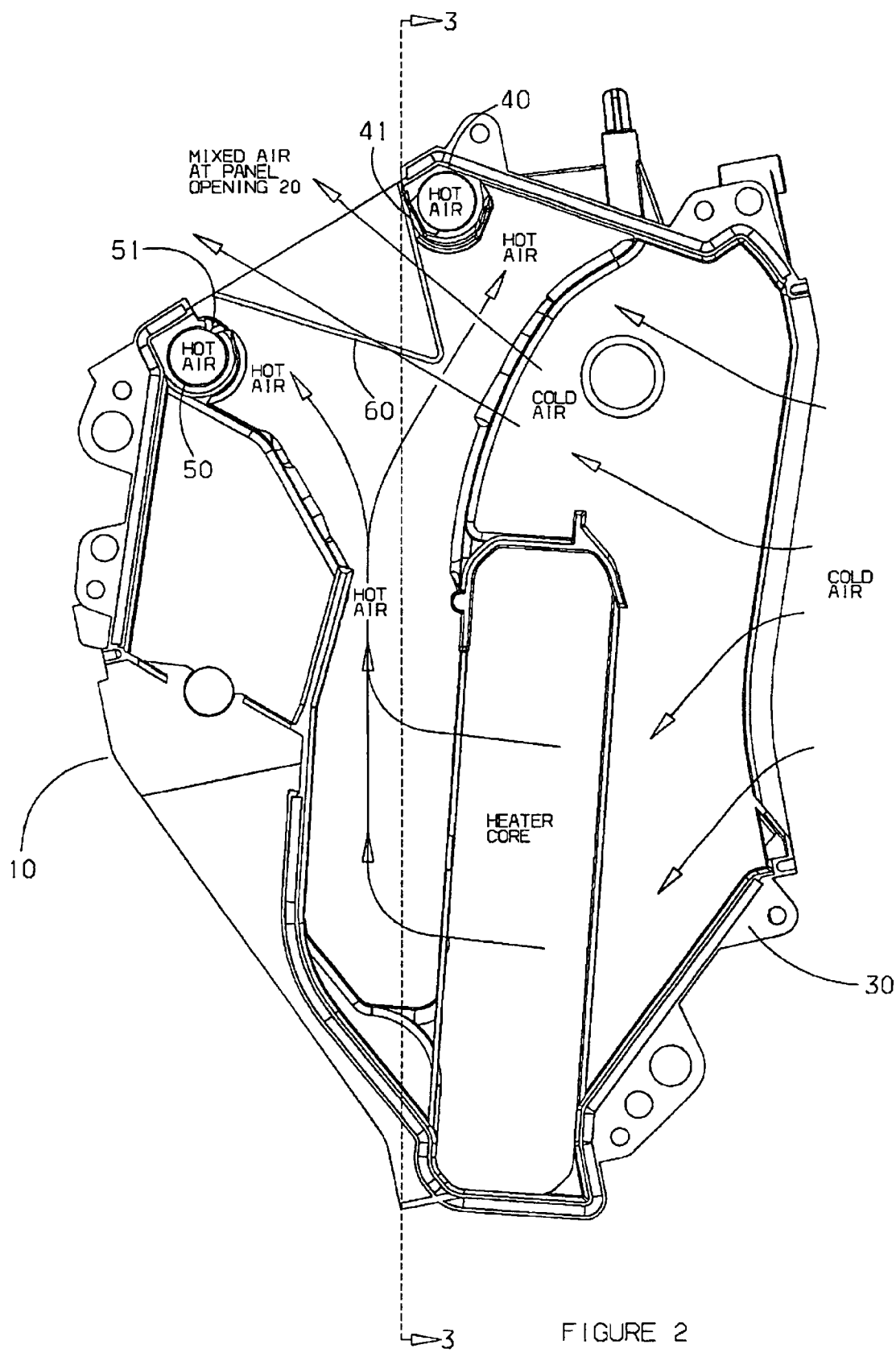
FIG. 2 is a cross-section of a ventilation unit according to an embodiment of the present invention.

FIG. 2 shows a preferred embodiment of the present invention in cross-section. Cold air passes directly through the unit to the outlet openings 20 through air ducts. The term "cold" air is to be understood relatively as air which is not passed through a heater core, for example, ambient air or air drawn in from the interior of the vehicle. Referring again to FIG. 2, another flow of air passes through the heater core and such air for the present purposes is referred to as "hot" air. It will be understood that the term "hot" is only relative to air which has not been passed through a heater core. It also will be appreciated by persons of skill in the art that the invention may be used for both air cooling and heating applications.

Figure 3:
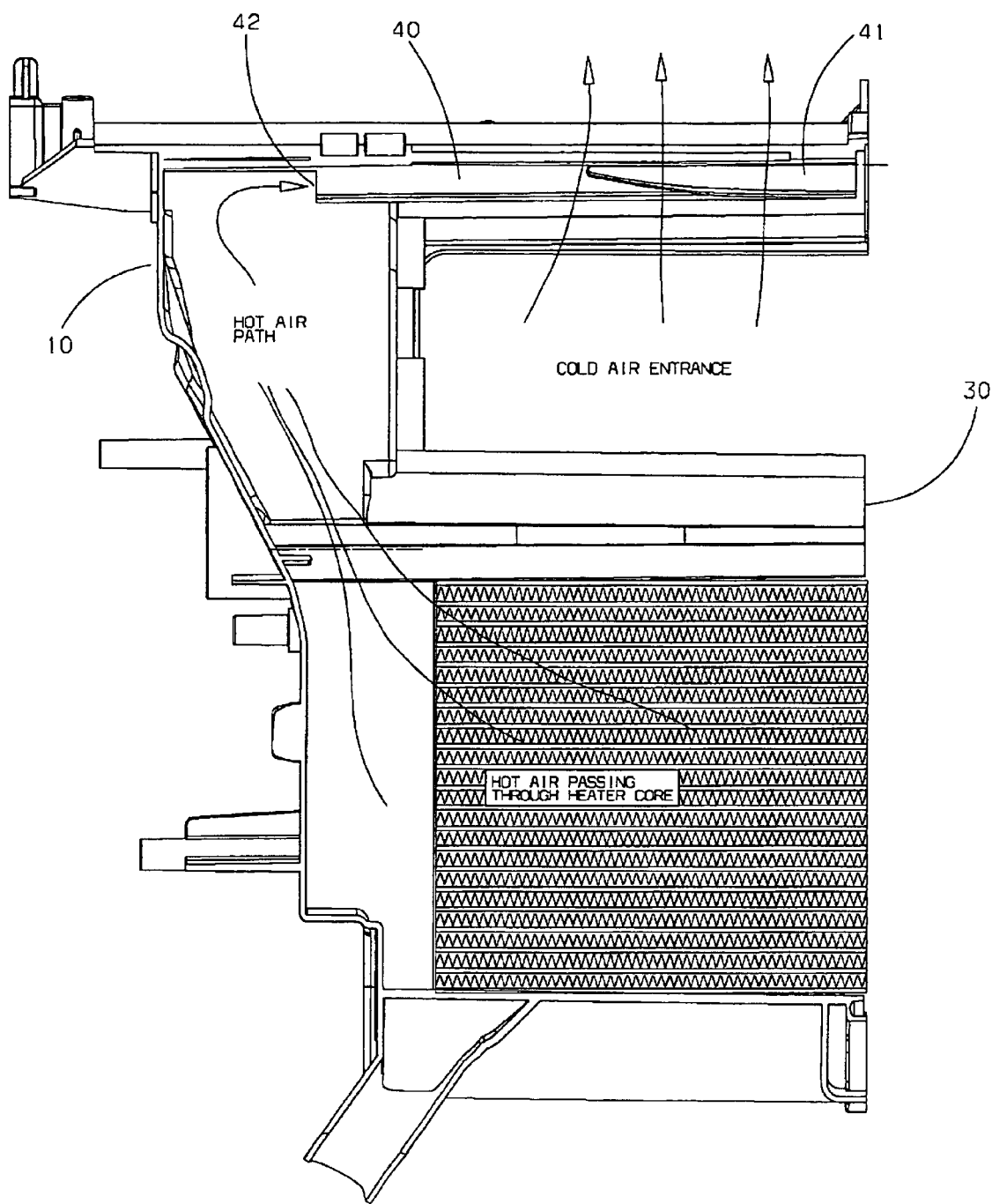
FIG. 3 is a cross-sectional view of the unit of FIG. 2 taken along the line 3—3.

The housing 30 comprises air ducts for supplying hot and cold air flows to the panel openings 20, from which the result in air stream enters into the interior of the motor vehicle. With reference to FIGS. 2 and 3, the hot and cold air flows undergo mixing prior to exiting the panel opening. This mixing of the hot and cold air flows is enhanced by at least one draft tube 40 disposed in the housing 30 adjacent the panel openings 20. In the present embodiment, the draft tube 40 is located adjacent a forward side of the panel openings and includes an outlet slot 41.

Outlet slot 41 is arranged so as to be exposed to the air stream exiting the panel openings. In the illustration of FIG. 3, the outlet slot 41 is located to the right in the exiting air stream, where the air is colder. When passing across the outlet slot 41, a draft is created within the draft tube 40, which draws hot air from an inlet opening provided at a first end 42 of the draft tube 40. In this manner, the colder portion of the exit air stream is mixed with hot air drawn laterally into the air stream (from the left in FIG. 3) through the draft tube 40.

Figure 4A:
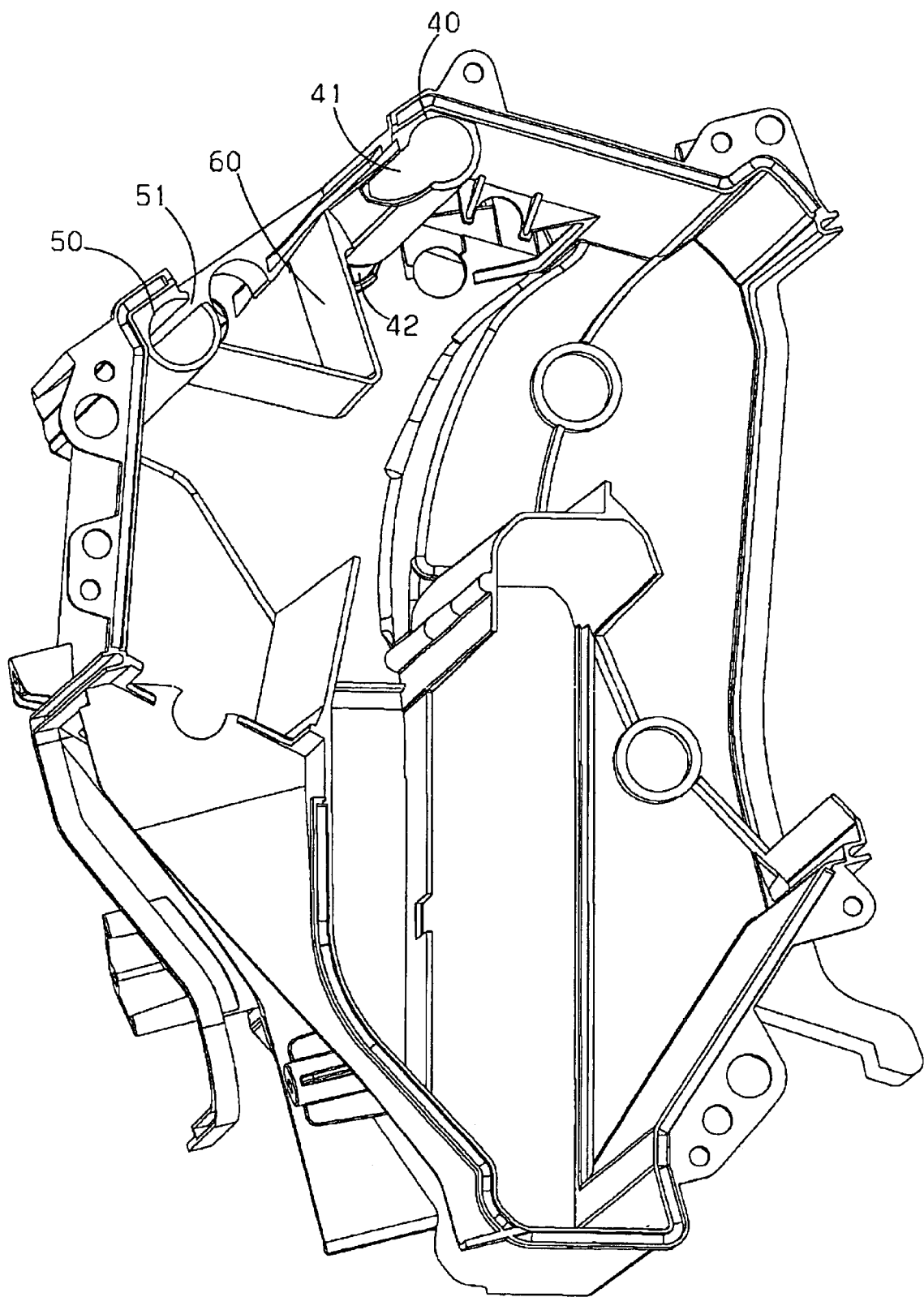
FIGS. 4A and 4B are perspective views of the embodiment of FIGS. 2 and 3.
Figure 4B:
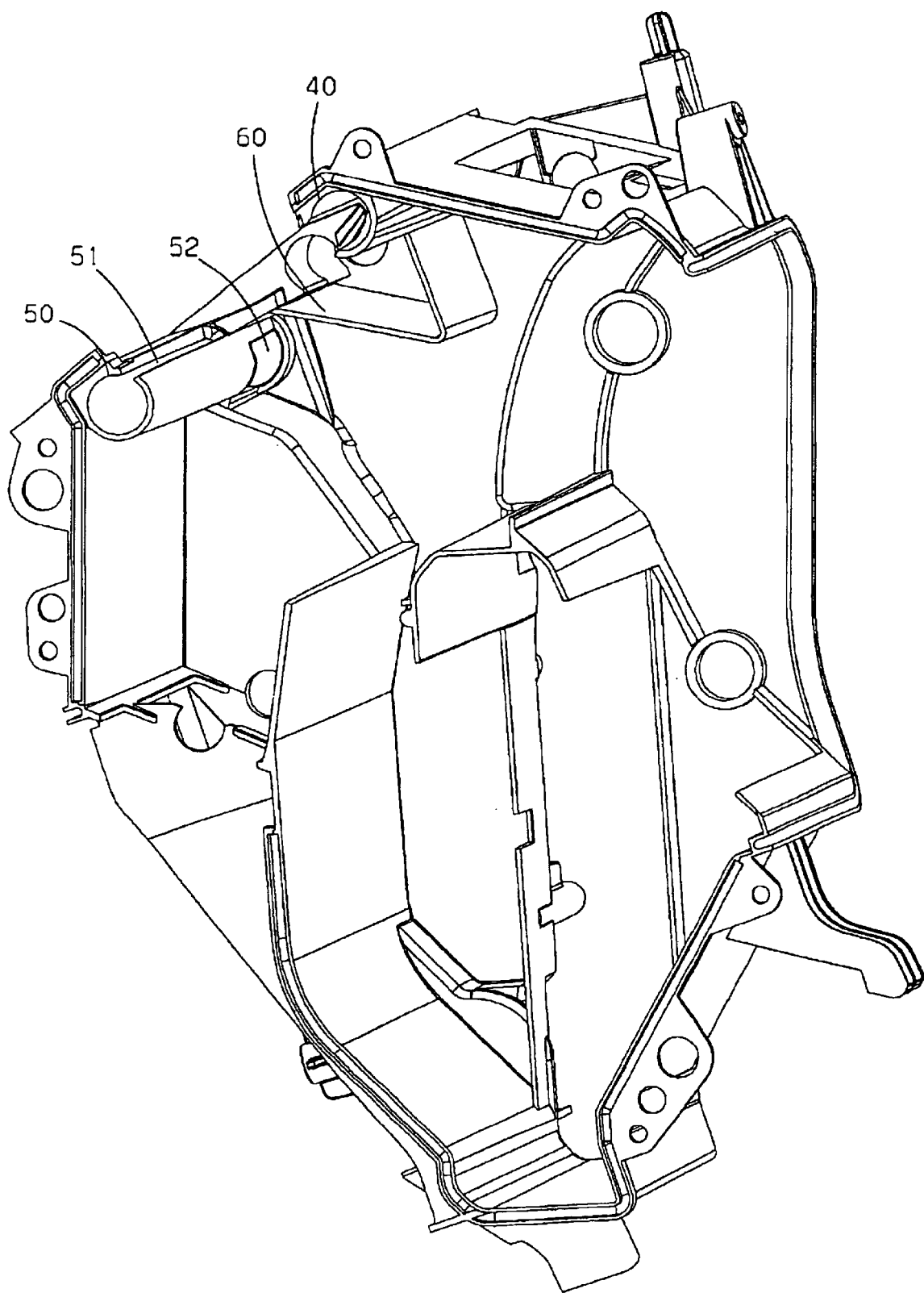

In the embodiments of FIGS. 2 and 3, two draft tubes (40, 50) are arranged along the elongate sides of the panel openings 20. One draft tube at a forward side and one at a rearward side of the pane) openings. The second draft tube 50 also includes an outlet slot 51, which is arranged to be exposed to the air stream as it leaves the outlet openings 20. The passing of the air stream over the slot 51 creates a draft which draws in heated air. As with the first draft tube 40, the second draft tube 50 has an inlet opening 52 at a first end which is located in the hot air flow. The disposition of the tubes and their inlet ends is also indicated in the perspective views of the ventilation unit shown in FIGS. 4A and 4B.

The outlet slots 41 and 51 of the draft tubes 40 and 50 are formed substantially axially in a sidewall of the respective tubes. The slots 41 and 51 can extend over the entire axial length of the respective tube, or any desired axial length. In a preferred embodiment, the slots 41 and 51 extend over at least half of the axial length of the respective tube 40, 50. As seen in FIG. 3, the outlet slot 41 also can have varying width depending on the axial position along the draft tube 40. With this feature, the amount of hot air delivered to a particular axial position in the air stream can he adjusted. The length and width of the outlet slot will be dimensioned according to the particular application or requirements for a given ventilation system. It will be understood that the size and shape of the outlet slots as well as the tubes can be adjusted as design parameters to ensure maximum mixing efficiency between the hot and cold airflows. Once having dimensioned the overall ventilation unit with respect to the tubes, no further adjustments need be made.

Furthermore, the draft tubes of the present invention are integrally molded when molding the unit housing, so that no additional assembly work is required in the manufacture of the present ventilation unit.

Another advantage of the present invention is a passive self-regulating effect which results from the use of the draft tubes. When the cold air doors are open for the cold air ducts, a maximum cold air velocity arises, in particular at one side of the air stream, for example on the right hand side of the air stream in FIG. 3. The maximum cold air velocity across the outlet slot 41 of the draft tube 40 produces the maximum draft of hot air and consequently the desired mixing effect. On the other hand, when the cold air doors are set toward the closed position, the cold air velocity and therefore the draft is reduced, however the requirement on drafted hot air is also less. Thus, the amount of hot air to be mixed into the cold air stream is regulated automatically.

In a further embodiment of the present invention, a baffle 60 is provided in the region of the first ends 42, 52 of the draft tubes 40, 50. The baffle 60 has a slight axial extension and is arranged to deflect hot air which would otherwise directly enter the panel opening 20 and direct it into the inlet openings 42 and 52 of the tubes 40 and 50. In the present embodiment, the baffle is "V" shaped, however, this baffle can also take on other forms. The baffle controls hot air from directly entering the panel opening 20, and further acts as a deflector to guide hot air into the region of the inlet openings 42, 52 of the draft tubes.

While this invention has been described with an emphasis upon particular embodiments, it should be understood that the foregoing description has been limited to the presently contemplated best modes for practicing the invention. It will be apparent that various modifications may be made to the invention, and that some or all of the advantages of the invention may be obtained. Also, the invention is not intended to require each of the above-described features and aspects or combinations thereof. In many instances, certain features and aspects are not essential for practicing other features and aspects. The invention should only be limited by the appended claims and equivalents thereof, since the claims are intended to cover other variations and modifications even though not within their literal scope.

What we claim is:

1. A ventilation unit for a motor vehicle comprising:

a housing with air ducts for supplying air through panel openings to the interior of the vehicle, and at least one draft tube disposed in the housing adjacent said panel openings, said at least one draft tube having an outlet slot arranged to be exposed to the air stream exiting said panel openings, wherein said outlet slot is formed axially in a side wall of the at least one draft tube.

2. The ventilation unit according to claim 1, wherein said at least one draft tube is arranged along an elongate side of the panel openings.

3. The ventilation unit according to claim 1, further including at least one additional draft tube disposed adjacent to a second elongate side of said panel openings, said at least one additional draft tube having an outlet slot arranged to be exposed to the air stream exiting said panel opening.

4. The ventilation unit according to claim 1, wherein a first end of the at least one draft tube includes an air inlet opening.

5. The ventilation unit according to claim 1, wherein said outlet slot extends over at least half of the axial length of the at least one draft tube.

6. The ventilation unit according to claim 1, where the outlet slot has a varying width along the axial direction of the at least one draft tube.

7. The ventilation unit according to claim 1, wherein a first end of the at least one draft tube is an air inlet opening.

8. A ventilation unit for a motor vehicle comprising:

a housing with air ducts for supplying air through panel openings to the interior of the vehicle, at least one draft tube disposed in the housing adjacent said panel openings, said at least one draft tube having an outlet slot arranged to be exposed to the air stream exiting said panel openings, wherein a first end of the at least one draft tube is an air inlet opening, and a baffle adjacent to the first end of the draft tube to deflect air toward the inlet opening at said first end.

9. The ventilation unit according to claim 8, wherein the at least one draft tube, the first inlet end and the outlet slot act together with the baffle to provide a passive self-regulating temperature stratification control.

10. A ventilation unit for a motor vehicle comprising:

a housing with air ducts for supplying air through panel openings to the interior of the vehicle, and at least two draft tubes integrally molded into the housing and disposed adjacent to at least two sides defined by the panel openings, wherein each of said at least two draft tubes includes an at least one axially formed outlet slot in a side wall of each of said tubes, which slots are arranged to be exposed to the air stream exiting said panel openings.

* * * * *